W. J. CONLON.
ELECTRIC WASH MACHINE.
APPLICATION FILED APR. 20, 1914.

1,254,638.

Patented Jan. 22, 1918.
5 SHEETS—SHEET 1.

Witnesses:
Leonard W. Novander
Leonard E. Bogue

Inventor
Walter J. Conlon
By Brown, Hanson & Boettcher
Attorneys

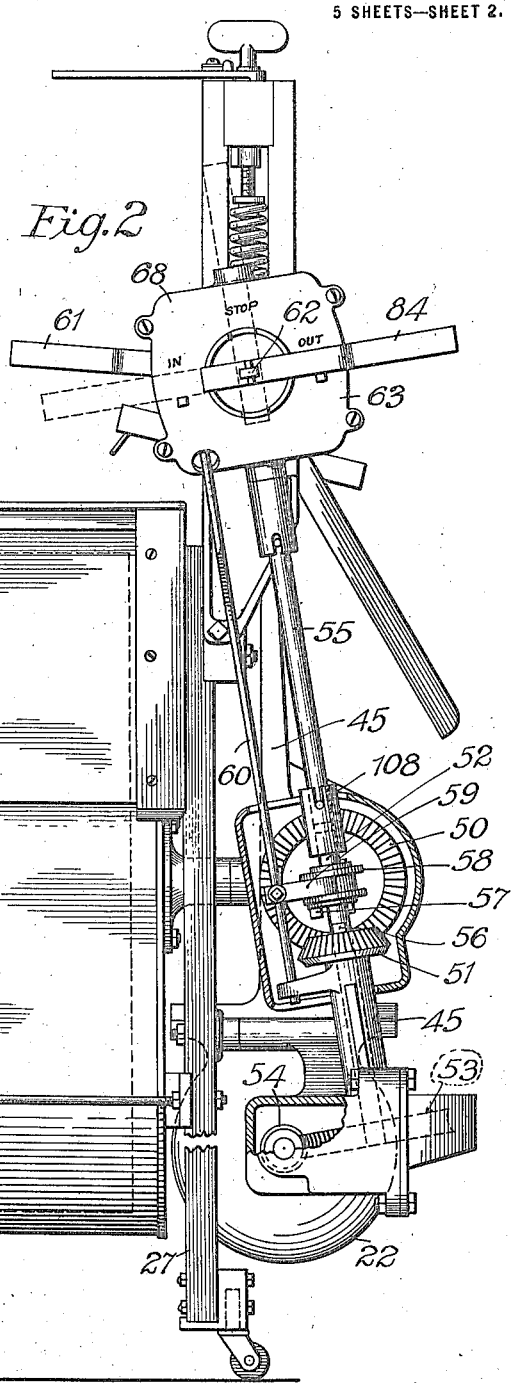
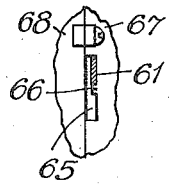

W. J. CONLON.
ELECTRIC WASH MACHINE.
APPLICATION FILED APR. 20, 1914.
1,254,638.
Patented Jan. 22, 1918.
5 SHEETS—SHEET 3.
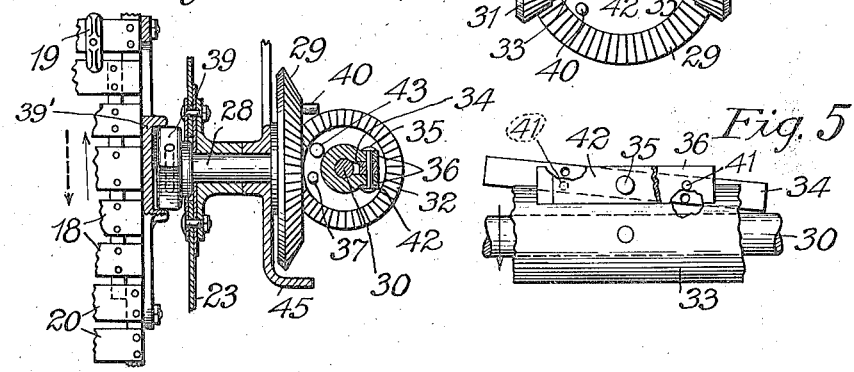

W. J. CONLON.
ELECTRIC WASH MACHINE.
APPLICATION FILED APR. 20, 1914.

1,254,638.

Patented Jan. 22, 1918.
5 SHEETS—SHEET 4.

Witnesses:
Leonard W. Novander
Leonard E. Bogue

Inventor
Walter J. Conlon
By Brown, Hanson & Boettcher
Attorneys

W. J. CONLON.
ELECTRIC WASH MACHINE.
APPLICATION FILED APR. 20, 1914.

1,254,638.

Patented Jan. 22, 1918.
5 SHEETS—SHEET 5.

Witnesses:
Leonard W. Novander
John A. Binnie

Inventor
Walter J. Conlon
By Brown, Hanson & Goettche
Attorneys

UNITED STATES PATENT OFFICE.

WALTER J. CONLON, OF CHICAGO, ILLINOIS.

ELECTRIC WASH-MACHINE.

1,254,638.
Specification of Letters Patent.
Patented Jan. 22, 1918.

Application filed April 20, 1914. Serial No. 833,045.

*To all whom it may concern:*

Be it known that I, WALTER J. CONLON, a citizen of the United States, residing at Chicago, in the county of Cook and State of Illinois, have invented certain new and useful Improvements in Electric Wash-Machines, of which the following is a full, clear, concise, and exact description, reference being had to the accompanying drawings, forming a part of this specification.

My invention relates to gearing and control mechanism, therefor.

The invention is especially applicable to combine washing and wringing machines. In machines of this type a single driving means, preferably an electric or other motor, furnishes power to drive a washing machine and a wringer either simultaneously or separately.

One object of this invention is to provide an improved and simplified gear mechanism to transmit power from the motor to the operating mechanisms.

Another object is to provide a simple and convenient control mechanism to enable the gearing to be readily thrown in and out of action as desired. Another object is to provide a controlling mechanism which will insure disconnection of the washing drum gears when the wringer gears are connected.

A still further object is to improve and simplify the gearing and control mechanism and to render the same capable of quick and convenient assembly.

In the drawings—

Fig. 2 is a side elevation of the same with certain of the parts broken away.

Fig. 3 is a detail view on the line 3—3 of Fig. 1, showing the construction of the mechanism for reversing the rotation of the washing drum.

Figs. 4 and 5 are fragmentary detail views of the driving mechanism for the drum.

Fig. 6 is a front view of the clutch and driving mechanism for the wringer rolls.

Figs. 7, 8 and 9 are fragmentary detail views of the control lever for controlling the clutch to the washing drum shaft.

Fig. 13 is a detail view of the connecting means between the bevel gear and the wringer shaft.

Fig. 14 is a detail view of the bevel gear showing the square recess in the hub thereof.

Figure 1:
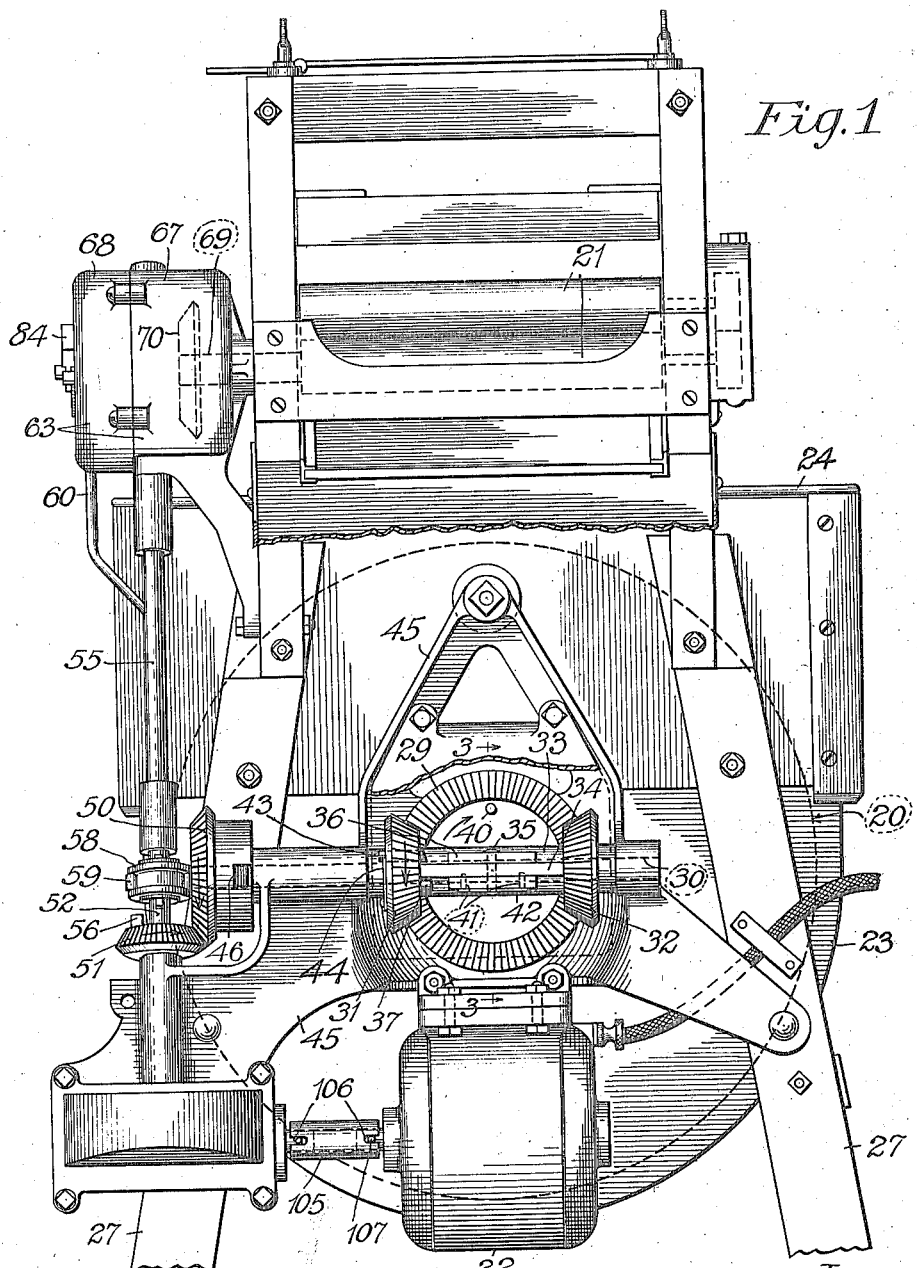
Figure 1 is a front elevation of a machine embodying my invention, certain of the parts being broken away to show the driving mechanism for the washing drum.

Although the invention has been illustrated as embodied in a specific machine, the invention is not limited to use only in that type of machine, but is applicable to other mechanisms and in different relations.

The machine comprises a combined washing and wringing machine, having a washing drum 20 and wringer rolls 21 which are driven by the electric motor 22. The drum 20 is inclosed in a suitable casing 23 having a semi-circular bottom portion and a rectangular top portion, and provided with a hinged cover 24 which is preferably made of sheet metal. This cover is composed of two parts hinged at 25 and attached to the casing 23 by the hinge 26, to allow the cover to be moved out laterally to disengage the various projecting parts of the machine when the cover is removed. The washing drum 20 is provided with a removable gate 18 held by a catch 19, for allowing ready access to the interior of the drum.

The various parts of the machine are supported by the legs 27 which are bolted to the casing 23 and which in connection with the casing form a framework for the other parts. Pivoted rollers are provided to allow the machine to be readily moved from place to place. The washing drum 20, shown in dotted lines in Figs. 1 and 2, substantially fills the casing 23 and, when the machine is in operation, this drum 20 contains the articles which are to be washed and the casing 23 contains the washing liquid into which the drum is partially submerged. In a machine of this character, it is desirable that the washing drum be rotated a number of times in one direction and then in the opposite direction the same number of times to prevent wadding of the clothes into a compact mass inside of the drum 20. I secure this effect by the use of automatic reversing mechanism of the type disclosed in Patent No. 1,077,748, granted to Thomas H. Phillips, Jr., on November 4, 1913.

On the end of stub shaft 28 is pinned a squared drive member 39 that fits into a corresponding socket member 39' which is attached to the drum. This allows the ready attachment and detachment of the driving shaft and the drum so that the drum 20 can readily be taken out of the casing 23 when so desired. A bevel gear 29 is attached to the outer end of shaft 28. This gear is driven for a definite number of revolutions in one direction of rotation indicated by the light arrow and is then driven in the opposite direction as indicated by the heavy dotted arrow, an equal number of revolutions.

The shaft 30, which is constantly driven by the motor 22 in one direction of rotation, bears two loosely mounted bevel pinions 31 and 32 which mesh with the bevel gear 29 at all times. A spacing sleeve 33 is rigidly attached to the shaft 30 and serves both to hold the bevel pinions in place and to transmit power intermittently to one and then the other of these pinions. This is accomplished by means of a bar 34 pivoted on a pin 35. The pin is mounted in two lugs 36 between which a groove is formed for the reception of bar 34. This bar 34 has only a limited play as the ends thereof strike against the bottom of the groove between the lugs 36. The outer ends of the bar 34 are adapted to engage at times the pins 37 and 38 mounted on the bevel gears 31 and 32, but, due to its pivotal mounting, only one end of this bar is able to engage one of these pins at a time.

In Fig. 4, the bar 34 is shown as being in contact with the pin 37 on the bevel gear 31. As the shaft 30 is constantly driven in one direction of rotation, as indicated by the light arrow, the sleeve 30, which is connected to said shaft, will drive the gear 31 because of the engagement of the bar 34 to the pin 37. The bevel pinion 32 revolves idly in mesh with the gear 29 at this time. After the gear 29, which is attached to the drum 20, has revolved a predetermined number of times in one direction, the bar 34 is swung about its pivot 35 to disengage the pin 37 and to engage the pin 38. This allows the gear 31 to be idle and the gear 32 to transmit power and thus drive the bevel gear 29 in the opposite direction of rotation as shown by the heavy dotted arrow. The tilting of the bar 34 is accomplished automatically by means of the pin 40. When the proper number of revolutions has been performed to bring the pin 40 within the radius of the end of the bar 34, pin 40 and the bar 34 will come in contact and, by a movement in the nature of a rolling motion, the end of the bar 34 will be forced inwardly to disengage the pin 37, but will have its other end raised to lie within the path of the pin 38 on bevel gear 32 and as the shaft 30 continues to revolve the bar 34 will engage the pin 38 and drive the gear 29 in the opposite direction.

To maintain the lever 34 positively in each position and to prevent any shifting, except by action of pin 40, a mechanism is provided for giving a snap motion from one position to the other. This is accomplished by means of the pins 41 which are attached to the flat spring 42 mounted on the side of the lug 36. Sockets are provided in the bar 34 into which the pins 41 are forced by the spring 42 to give the bar 34 a snap action. The ends of the pins 41 are preferably rounded or tapered. The pins 37 and 38 are angularly displaced relatively to the bar 34 so that, when the bar is snapped out of engagement with one of the pins, the shaft 30 will turn part of a revolution before the bar engages the other pin. This gives the drum connected to the bevel gear 29 time to slow down and it may even come to rest and, thus, jarring or straining of the mechanism, which would occur in overcoming inertia of the moving drum if its movement were immediately reversed, is obviated.

In operating the machine, it has been found that the clothes will sometimes cling to the sides of the drum 20 and will tend to rotate the drum ahead of the driving means. This moves the pinion ahead of the driving bar 34 and when the bar overtakes the pin 37 or 38, it engages the pin with considerable jar and shock in again starting the drum to revolve. This action would also occur if the machine were run idly. The inertia of the drum is considerable and when the bar engages the pin to start the drum the shock causes the drum to rebound and to run ahead of the driving means.

This running ahead or rebounding is very undesirable, being noisy and disagreeable as well as being dangerous to the mechanism. Special means in the shape of a latch is provided to prevent such action. The latch comprises a bevel pin 43 passing through a hole in the web of the pinion and pressed inwardly by spring 44. In action the bar 34 passes over the beveled end of the pin 43 to come into engagement with one of the driving pins 37 or 38 and is then held between the driving pin and the latch pin until this bar 34 is snapped out of engagement with both pins by the action of the pin 40.

Figure 15:
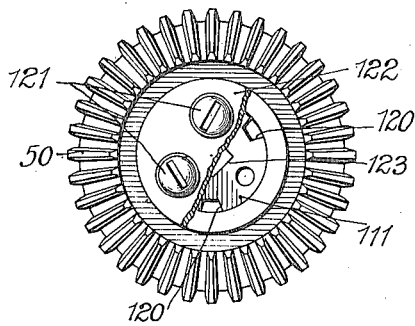
Fig. 15 is a front view with a part broken away of the shock absorbing friction clutch between the motor shaft and the automatic reversing mechanism.
Figure 16:
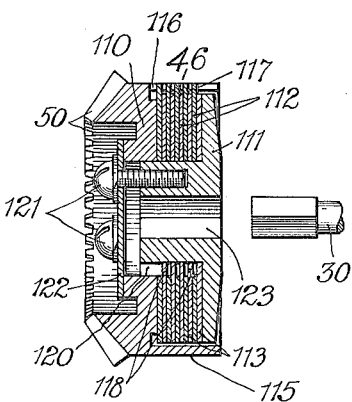
Fig. 16 is a cross-section of the same.
Figure 17:
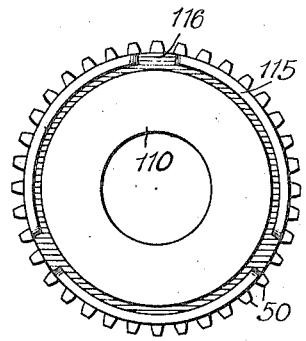
Fig. 17 is a rear elevation of the outer clutch member.
Figure 18:
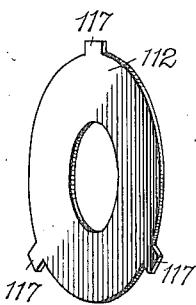
Fig. 18 is a view of one of the friction disks.
Figure 19:
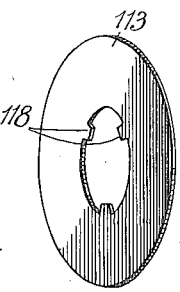
Fig. 19 is a view of a coöperating friction disk.
Figure 20:
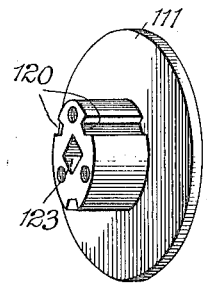
Fig. 20 is a view of the inside clutch member.

To supplement the action of the reversing mechanism, a shock absorber 46 has been introduced in the driving connections for the washing drum. This shock absorber, which consists of a multiple disk clutch, is mounted in the hub of the gear 50. A detailed description of this clutch will be given later in connection with Figs. 15 and 20. The positive gripping action caused by the latch 43 does not entirely obviate the difficulties imposed upon the transmission mechanism, but the shock absorbing clutch 46 supplements this action so that a very satisfactory transmission is secured.

The bearings for the shafts 28 and 30 are provided in the bracket casting 45 which is bolted to the casing 23 and the legs 27. The casting also forms a support for the motor 22 which drives the power shaft 30. The shaft 30 is driven through the bevel gears 50 and 51 from the main shaft 52, which is connected to the motor shaft by means of the gear wheel 53 and a worm 54 mounted on the extension of the motor shaft.

The bevel pinion 51 is loosely mounted on the shaft 52 and is adapted to be clutched to said shaft only when it is desired to actuate the drum 20 of the washing machine. An extension 55 of the shaft 52 is connected through gears to the wringer rolls 21. The clutch for throwing the washing mechanism in and out of gear comprises a projection 56 mounted on the pinion 51 and a projection 57 mounted on the sliding sleeve 58. This sleeve is keyed to the shaft 52 and, when shifted into the lower position where the projections 57 and 56 engage each other, power is transmitted to the washing mechanism. The sleeve 58 is provided with a groove into which a U-shaped shifting fork 59 is fitted.

A rod 60 connected to a lever 61 is adapted to shift the clutch member 58 and thereby to connect or disconnect the washing mechanism from the main driving shaft. The lever 61 is pivoted on a pin 62 attached to the side of the casing 63. The pin 62 is provided with a flange 64, between which flange and the casing 63, the inner end of the lever 61 is clamped. This lever is made of spring metal and the clamping action of the pin 62 tends to draw the entire lever 61 toward the side of the casing. This casing 63 is made in halves which are joined together by lugs and bolts. A slot 65 is provided in the casing 63 and the handle 61 is allowed a limited movement by said slot. A projection 66 holds the handle 61 at either end of its movement, to prevent shifting of the clutch member 58 accidentally. The resilience of the spring handle 61 and the clamping action of the pin 62 prevents disengagement from the projection 66. The inner half 67 of the casing 63 forms a bearing for the extension 55 of the main power shaft and the bearing for the wringer shaft 69 shown in dotted lines in Fig. 1.

A bevel gear 70 is mounted on the extremity of the wringer shaft 69 and two bevel pinions 71 and 72 are loosely mounted on the extension of the shaft 55. A sleeve 73 attached to the shaft 55 serves to space the pinions 71 and 72 and bears a clutch member 74. This clutch member 74 is keyed to the sleeve 73 but may slide on said sleeve. A U-shaped shifting fork or bracket 75 is adapted to engage a groove in the clutch member 74 to shift the clutch member into engagement with the pinion 71 or the pinion 72 or to hold the same in a neutral position between said pinions. The clutching is effected by projections 76 and 77 mounted on the clutch member 74 and projections 78 and 79 mounted on pinions 71 and 72, respectively. The shifting fork 75 is mounted on a rod 80 supported by lugs 81 which preferably are formed integral with the outside half 68 of the casing 63. The bracket 75 is moved along the rod 80 by means of the eccentric pin 82 mounted on the flange 64 of the pin 62. The pin 82 projects into a slot 83 in the shifting fork. It can be seen that rotation of the pin 62 will cause a rectilinear motion of the shifting bracket 75. The pin 62 is cut away at its outer extremity to form a rectangular or flattened projection which fits into a corresponding slot in a lever 84. The lever 84 is preferably made of spring metal and is adapted to drop into notches in one or more positions. The pin 62 holds the two levers 61 and 84, against the casing 63 (see Fig. 8) to secure a lateral spring action of said levers to cause them to stay in the notches.

As before stated, the clutch member 74 may occupy any one of three positions, namely, a neutral position and two driving positions. The position of the lever 84 corresponding to the neutral or stop position is shown as the dotted line position indicated by the legend "Stop" in Fig. 2. When the lever is in the full line position shown in Fig. 2, the lower pinion 72 is clutched to the shaft 55 by means of clutch member 74, which is keyed to the shaft, and the wringer rolls are rotated in an outward or forward direction. When the lever is in the "in" position, the clutch member is in engagement with the pinion 71 and the wringer rolls are rotated in an inward or reverse direction.

Figure 10:
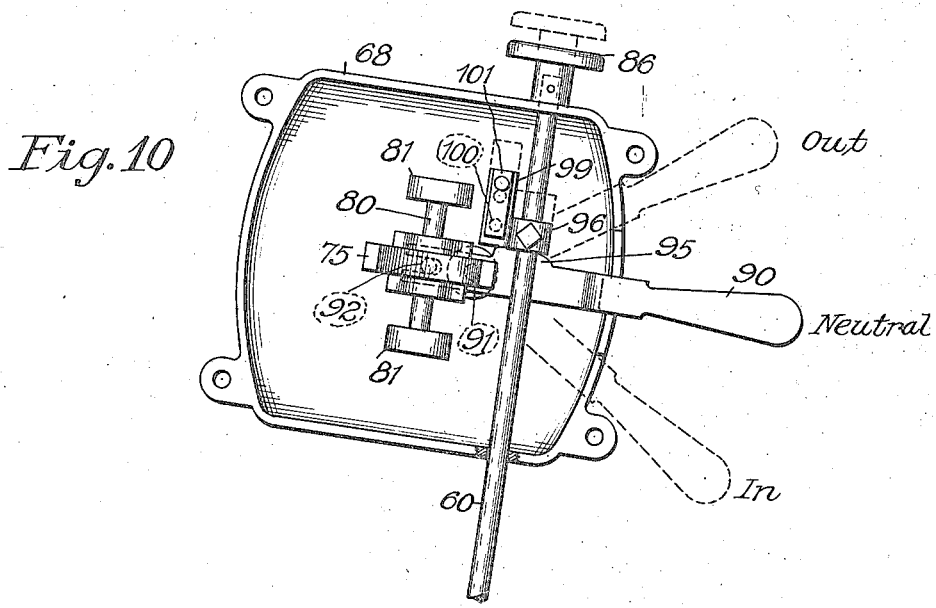
Fig. 10 is a view of a modification of the control means for the clutches.
Figure 11:
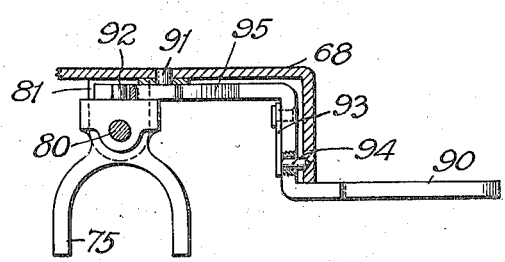
Figs. 11 and 12 are fragmentary detail views showing locking means for the control means shown in Fig. 10.
Figure 12:
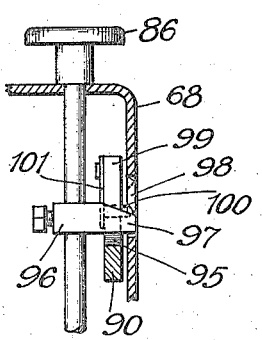

In Figs. 10 to 12, inclusive, a modification of the clutch controlling mechanism is shown. In this modification, the rod 60 for shifting the clutch member 58 is passed through the casing 68 which forms bearings for it, and is provided at its upper end with a head or button 86. A lever 90 pivoted at 91 is provided with a forked extremity which engages a pin 92 mounted on the shifting bracket 75. The shifting bracket 75 is slidable on the rod 80 mounted on the lugs 81, which are preferably integral with the casing. The lever 90 is preferably made of spring material and is adapted to be held in the upper or lower positions by dropping into notches at the proper point in its movement in a manner similar to that shown in Fig. 9. A notch may also be provided for the central position to prevent accidental displacement of the lever from this position. Instead of employing a spring handle, I may use a rigid handle 90 and mount thereon a pin 94, forced into a socket in the casing by a spring 93, as shown in Fig. 11, to hold the lever 90 in any one of its three positions. The lever 90 is provided with a cam member 95 which is adapted to engage a collar 96 mounted on the rod 60. When the lever 90 is moved to the uppermost position, the cam member 95 engages the collar 96 to force the rod 60 upward. Upward movement of the rod 60 disengages the clutch member 58 from the pinion 51, thereby stopping the motion of the washing drum 20. Movement of the lever 90 to the uppermost position causes the clutch member 74 to engage the pinion 72 to drive the wringer rolls in an outward direction. The clutch member 58 cannot be thrown into operation to start the washing drum while the wringer is in gear and operating in an outward direction. The necessity for this interlocking action is apparent when it is considered that when the wringer rolls are operated in an outward direction, the clothes are being drawn from the washing drum which must first be stopped and opened. Movement of the washing drum must be prevented at this time as an accidental starting of the drum would most likely cause injury to the clothes being wrung at this time, or else might cause injury to the operator.

The rod 60 is held in either position to which it may be moved by means of a locking mechanism, in this case, a tapered pin, fitting into a corresponding socket. The collar 96 is provided with an extension 97 which is adapted to slide in a groove 98 in the casing 68. Another extension 99 of the collar 96 bears a pin 100 which is forced by a spring 101 into the sockets provided at both ends of the movement of the collar 96. By means of this pin, the rod 60 is held with considerable firmness against accidental displacement. The lever 90 may be moved to a down position independently of the movement of the rod 60 to control the action of the wringer rolls. The clutch mechanism for the washing drum can be thrown into operation only when the handle 90 is in the neutral position or in the lower position. The reason for this interlocking arrangement will be more apparent when viewed in connection with the operation of the device as will be set forth below.

In building machines of this type, it is of great importance that the various parts be capable of convenient and quick assembly and that the entire mechanism be of the utmost simplicity and ruggedness. It will be noticed that the assembly of the particular embodiment above described is greatly facilitated by the construction shown.

The motor may readily be disconnected by unbolting the same from the frame member 45. The motor shaft is connected to the worm shaft by the coupling 105 which comprises a sleeve member having notches 106 cut in the side walls thereof. The inner bore of this sleeve member is of a size suitable to receive the ends of the shafts to be connected. Pins 107 are driven through the end of each shaft and are engaged to fit in the notches 106 of the sleeve member. The notches 106 are of sufficient depth to receive the pins and to prevent disengagement with the pins by movement of the sleeve in either direction. The shaft 55 which is an extension of the shaft 52, is attached by a similar coupling 108 (Fig. 2). In this case, the one extremity of the coupling 108 is rigidly attached to the end of the shaft 52 and the other end is notched to receive the pin in the shaft 55. The notch in these couplings may be formed in both sides of the sleeve and the pin may extend completely through the shaft or, if preferred, only one notch may be employed and the pin, therefore, would project only on one side of the shaft. This form of coupling may be employed to attach the wringer shaft 69 to the bevel gear 70, or, I may employ the mechanism shown in Figs. 13 and 14 to connect the gear and the wringer shaft. In this modification, the gear 70 has a hub containing a square recess 110 into which the end of the shaft 69, which is similarly formed, is fitted. Instead of having a square recess in the hub of the gear, a triangular or other non-circular recess may be provided and the end of the shaft 69 will then be formed accordingly. Of course, it is evident that the relation of the parts may be reversed, that is, that the recess may be in the shaft 69 instead of in the hub of the gear.

The friction clutch 46 is shown in detail in Figs. 15 to 20. It consists essentially of an outer clutch member 110, which is formed an extension of the hub of the gear wheel 50, an inner clutch member 111, with a plurality of friction disks coöperating with the clutch members. Alternate ones 112 of these disks are connected with the outer clutch member. The other disks 113 are connected with the inner clutch member and rotate therewith. The flange 115 of the member 110 has slots 116 cut lengthwise at symmetrical points on its circumference. Teeth or projections 117 formed on the outer edge of members 112 are adapted to fit into these slots and to have positive engagement therewith. The disks 113, which alternate with the disks 112, have teeth 118 formed on their inner edge. These teeth are adapted to have positive engagement with the grooves 120 formed on the hub of the inner clutch member. It can thus be seen that alternate ones of the disks are connected with one clutch member and the others are connected with the other clutch member. Pressure is applied to the disks by means of the screws 121 and the pressure or face plate 122 which bears against the end of the outer clutch member 110. The clutch may be tightened or loosened as found desirable by adjusting the screws 121. The inner clutch member 111 is provided with a rectangular bore which receives the squared end of the shaft 30. The friction clutch serves a double purpose in the present structure. It serves as a friction clutch for the motor and prevents the motor being stalled and burned out, and it serves also as a shock absorber for the reversing mechanism to give a smooth reversal of motion.

A brief description of the operation of the mechanism illustrated will now be given.

The drum 20 is opened by means of a gate indicated in Fig. 3 and the clothes are placed inside the drum. The casing 23 is then partially filled with washing water. The gate of the drum is closed and the cover 24 is closed and the machine is ready for the washing operation.

Current is supplied to the electric motor to drive the power shaft 52. The handle 61 shown in Fig. 2 is moved to a lower position to throw the clutch mechanism for the washing drum into engagement with the power shaft. The shaft 30 transmits motion to the gear 29 and to the washing drum 20, first through one of the bevel pinions and then through the other, by the operation of the automatic reversing mechanism. After the clothes have been sufficiently washed, the lever 61 is moved to the upper position to disengage the washing clutch mechanism. The cover 24 may be raised and the drum 20 opened to give access to the washed articles. The lever 84, which, during the washing operation, has stood at the "stop" position, (Fig. 2) is now moved to the lower or out position, and the clothes in the drum 20 may now be wrung out.

It is important at this time that the lever 61 be not moved to the lower position, as that would start the drum 20 revolving. The mechanism shown in Figs. 10, 11 and 12 safe-guards against such accidental operation by interlocking the washing clutch and the wringer clutch. After the clothes have been wrung out, the drum 20 may be filled with a second batch of clothes and the lever may be thrown to connect the washing drum with the driving mechanism. The lever 84 in Fig. 2, or lever 90 in Figs. 10 and 11, should be placed at the stop position to prevent useless running of the rolls. It may be desired at this time to wring out the previous batch of clothes which may have been rinsed or otherwise treated. This operation may be performed by moving the controlling lever to the "in" position, thus connecting the wringer rolls to be driven in an inward direction. It is apparent that no damage to the clothes or to the operator is likely to result when the rolls are turned in the inward direction as the cover 24 is closed at this time.

It will be seen that the construction above provided guards against possible injury to the operator by accidental or careless manipulation of the levers and provides a structure of very great practical utility which will carry on the various operations in an economical and expedient manner.

It will also be seen that the parts are so constructed and coördinated as to lend themselves to cheapness of construction and great facility of assembly.

What I claim as new and desire to secure by Letters Patent of the United States is:

1. In a combined washing machine and wringer, a washing drum shaft, a wringer shaft, a power shaft, reversing gear and clutch mechanism for operatively connecting said wringer shaft with said power shaft, gearing and a clutch for operatively connecting said washing drum shaft with said power shaft, and interlocking mechanism for preventing driving engagement of the clutch for the washing drum shaft while the clutch for the wringer shaft is in engagement to drive the wringer shaft in a forward direction.

2. In combination, a power shaft, a wringer shaft, a washing drum shaft, gearing and a clutch for operatively connecting said washing drum shaft with said power shaft, said clutch having a neutral and a driving position, gearing and a clutch for operatively connecting said power shaft and said wringer shaft, said last named clutch having a neutral, a forward driving and a reverse driving position, and means to insure that the first-named clutch will be in neutral position when the second-named clutch is in the forward driving position.

3. In combination, a power shaft, a wringer shaft, a washing drum shaft, gearing and a clutch for operatively connecting said washing drum shaft with said power shaft, said clutch having a neutral and a driving position, gearing and a clutch for operatively connecting said power shaft and said wringer shaft, said last-named clutch having a neutral, a forward driving and a reverse driving position, and means to insure that the first-named clutch will be in neutral position when the second named clutch is in the forward driving position and to allow said first-named clutch to be moved into either of its positions when the second named clutch is in its neutral or reverse driving position.

4. In combination, a power shaft, a washing drum shaft, a wringer shaft, gearing and a clutch for operatively connecting said washing drum shaft with said power shaft, said clutch having a neutral and a driving position, gearing and a clutch for operatively connecting said power shaft and said wringer shaft, said last-named clutch having a neutral, a forward driving and a reverse driving position, and a lever to move said clutches simultaneously.

5. In combination, a power shaft, a washing drum shaft, a wringer shaft, gearing and a clutch for operatively connecting said washing drum shaft with said power shaft, said clutch having a neutral and a driving position, a shifting rod connected to said clutch, gearing and a clutch for operatively connecting said power shaft and said wringer shaft, said last-named clutch having a neutral, a forward driving and a reverse driving position, a casing inclosing said last named gearing and clutch and forming a bearing for said rod, a shifting means for said last-named clutch mounted on said casing, and a lever for operating said shifting means and for moving said rod.

6. In combination, a shaft, a bevel gear thereon, a pair of beveled pinions in mesh with said gear, a shaft upon which said pinions are mounted, a sleeve between said pinions, said sleeve attached rigidly to said shaft, a casing surrounding said gears and forming bearings for said shafts, a clutch member adapted to connect the sleeve with either of said pinions, a shifting fork for shifting said clutch member, said shifting fork being mounted on the casing and a lever for moving said fork, said lever pivoted to the side of said casing and being sprung against the side of said casing to engage a notch therein to retain the clutch in position.

7. In combination, a power shaft, a washing drum shaft, a wringer shaft, gearing and a clutch to connect the washing drum shaft and the power shaft, a bevel gear on said wringer shaft, two beveled pinions in mesh with said gear mounted loosely on said power shaft, a clutch to connect either of said pinions to said power shaft, a casing surrounding said last named clutch, gear and pinions and forming a bearing for said pinions and power shafts, a lever for shifting said second-named clutch mounted on the outside of said casing, a lever for shifting said first-named clutch mounted on the inside of said casing, and a pin passing through said second-named lever and said casing and rigidly attached to said first-named lever and bearing on its inner end a projection for shifting said second named clutch when said first-named lever is operated.

8. A driving shaft, a driven shaft having a squared end adjacent said driving shaft, a bevel gear connected to said driving shaft, a collar mounted on said driven shaft, bearing means adjacent said collar for preventing endwise motion of said driven shaft, and a bevel gear having a square socket fitting over the squared end of the said driven shaft, said gear meshing with said first gear.

9. In combination, a shaft, a bevel gear thereon, a bearing for said shaft on the back of said bevel gear and preventing movement of said gear, a shaft at right angles to said first shaft and having a square end adjacent to said first shaft, a bearing preventing endwise motion of said second shaft, and a bevel gear having a hub provided with a square socket loosely fitting over the square end of said shaft, said gear meshing with said first gear.

10. In combination, a shaft, a bevel gear thereon, a bearing for said shaft on the back of said bevel gear and preventing movement of said gear in that direction, a shaft at right angles to said first shaft and having a square end adjacent to said first shaft, a bearing preventing endwise motion of said second shaft, a bevel gear having a hub provided with a square socket loosely fitting over the square end of said shaft, said gear meshing with said first gear, and a friction clutch mounted between said gear and said hub.

In witness whereof, I hereunto subscribe my name this 17th day of April A. D. 1914.

WALTER J. CONLON.

Witnesses:
 JOHN A. DIENNER,
 LESLIE W. FRICKE.